Aug. 6, 1957
G. L. CARRINGTON ET AL
2,802,116
CONTROL SYSTEM
Filed Sept. 13, 1954
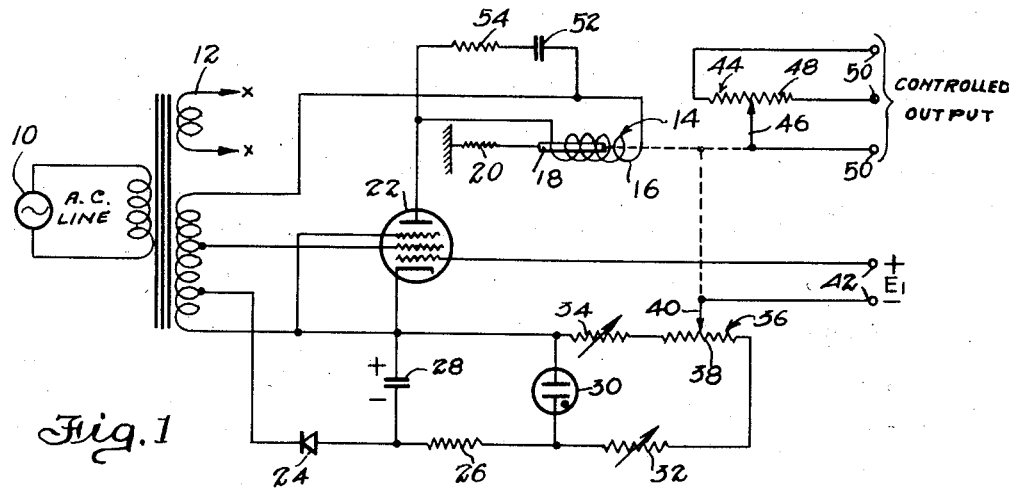
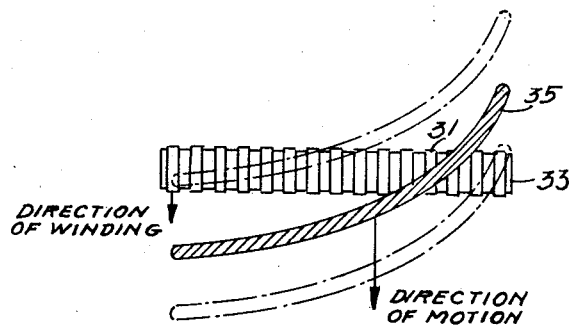
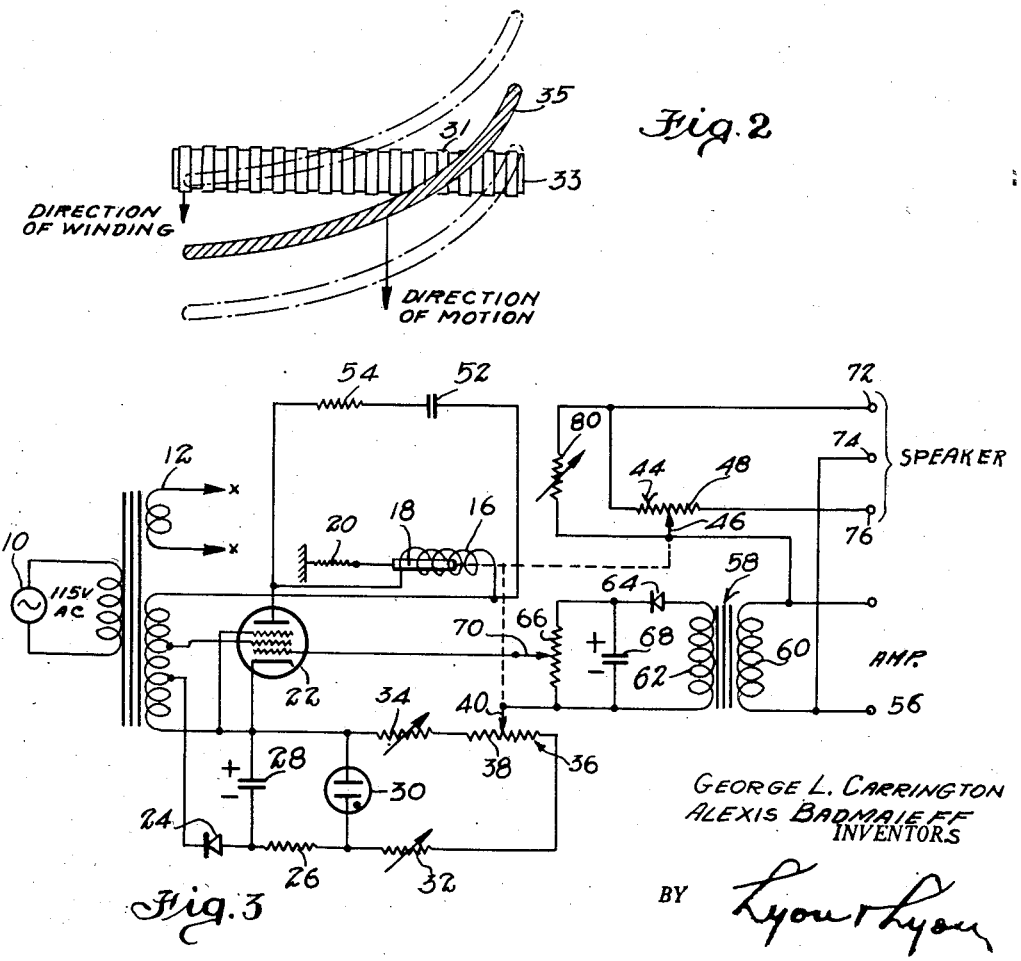
GEORGE L. CARRINGTON
ALEXIS BADMAIEFF
INVENTORS
BY Lyon & Lyon
ATTORNEYS United States Patent Office 2,802,116
Patented Aug. 6, 1957

2,802,116

CONTROL SYSTEM

George L. Carrington and Alexis Badmaieff, Los Angeles, Calif., assignors to Altec Lansing Corporation, Beverly Hills, Calif., a corporation of Delaware Application September 13, 1954, Serial No. 455,708

7 Claims. (Cl. 307—31)

This invention relates to a control system and, more particularly, to an improved servo-mechanical control system.

Completely electronic control systems are known which are employed as "compressors" or "expanders" or limiters. These systems are extensively employed in audio systems for the purpose indicated by their names; i. e., a limiter is used to prevent the amplitude of audio signals from exceeding a predetermined maximum; a compressor is used to compress a range of signal amplitudes into a desired range; and an expander is the reverse and is used to increase signal amplitudes of signals beyond their actual amplitudes. These control systems operate satisfactorily in accordance with the limits for which they were designed. However, each function requires a different arrangement, different tube types, and they are fundamentally fairly complex circuits. The circuits themselves are single-purpose circuits.

A feature of this invention is the provision of a simple servo-mechanical control system that can be employed to perform any of these functions.

Another feature of the present invention is the provision of a novel, useful, and inexpensive electro-mechanical control system.

Yet another feature of the present invention is the provision of a basic type of electro-mechanical control system which is versatile and which can be altered very simply to provide a desired control function.

These and other features of the invention are achieved by a servo-mechanical system wherein an amplifying device such as an electron-discharge tube is coupled in series with a solenoid coil. The solenoid has an armature which is biased to always return to a starting position. A variable bias is applied to the electron-discharge tube by means of a potentiometer having a slider which is coupled mechanically to the armature of the solenoid to be moved therewith. The position of the solenoid armature is determined by the excitation applied to the solenoid coil, which, in turn, is determined by the current flowing through the tube. The armature of the solenoid is also coupled mechanically to the slider arm of a second potentiometer. This second potentiometer is inserted in an external utilization circuit. Control signals are applied to the control grid of the electron discharge tube which varies the tube current which, in turn, determines the position of the armature of the solenoid and controls the bias applied to the tube thereby. The second potentiometer slider is also varied. The amount of armature motion is a function of the relationship between the input control signal and the change in resistance of the bias-control potentiometer caused thereby. The second potentiometer may also have its resistance change per unit of motion of the armature established to provide any desired type of control function. Thus, there are at least two parameters in the subject invention which may be varied simply to provide a desired end result.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a schematic diagram of an embodiment of the invention;

Figure 2 is a view of the potentiometer and wiper arm which may be employed with the embodiment of the invention; and Figure 3 is a circuit diagram showing the embodiment of the invention employed as an expander or compressor.

Referring now to Figure 1, a source of power 10 is coupled through a power transformer 12 to the embodiment of the invention for the purpose of supplying power thereto. This includes a solenoid 14 having a coil 16 and a movable armature 18 which is biased to an initial position by a spring 20. A tube 22 is electrically connected in series with the solenoid coil. One end of the secondary of the transformer 12 is connected through the solenoid coil 16 to the plate of the tube 22. The other end of the secondary of the transformer is connected to the cathode of the tube 22. The suppressor grid of the tube is connected to the cathode, and the screen grid is connected to a tap on the secondary of the transformer. It is preferred that the tube 22 have a high transconductance.

A bias potential is developed and applied to the cathode of the tube by using a tap from the transformer through a rectifier 24, resistor 26, and condenser 28. Voltage-regulator tube 30 is employed to maintain constant the value of this bias. Rheostats 32 and 34 are inserted for the purpose of controlling the amplitude and limits of the current flowing through the bias circuit. A first potentiometer 36 has a resistance 38 which is connected across the source of bias potential. The slider 40 of the first potentiometer is mechanically coupled (as represented by the dotted lines) to the armature of the solenoid to be movable therewith. Accordingly, as the armature moves the potentiometer slider 40 will provide different values of bias voltage to a pair of control terminals 42, to which control voltage from an external source is applied to the system. Therefore, this bias potential is applied through the external control voltage source to the grid of the tube 22. Since the polarities of the two biases are opposite and in series, the magnitude of the resultant bias to tube 22 is held constant due to the automatic control of potentiometer 36.

A second potentiometer 44 also has a slider 46 and a resistor 48. The slider 46 is also mechanically connected to the armature 18 to be movable therewith. The second potentiometer is employed in the circuit to be controlled. Output terminals 50 may be used for connecting to the second potentiometer for this purpose.

In operation, a control signal is applied to the terminals 42. This causes the tube 22 to draw current, thereby exciting the solenoid coil. The solenoid armature is caused to move and moves therewith the sliders of the first and second potentiometers. This, in turn, changes the bias applied to the tube by the first potentiometer and opposes the bias provided by the control signal E, in accordance with the desired functional relationship established between the potentiometer resistor 38, the amplitude of the motion of the armature 18, and the control signal. The first potentiometer may be designed to compensate for any nonlinearities in the control signal and thus provide a linear variation of the armature with changes in the control source. The second potentiometer may be designed to provide any independent function. Either one or both of the potentiometers may also be designed to have a nonlinear characteristic to fit a desired nonlinear function, such as a logarithmic increase of resistance versus a linear motion. The bias applied via the first potentiometer opposes the control signal in a manner to achieve a desired type of operation.

The alternation of a potentiometer to provide a desired function may be accomplished very simply in a manner shown in Figure 2. Although any other types of potentiometers may be used with the embodiment of the invention without departing from the scope thereof, preferred types are those having the resistance wire 31 wound on a core 33. The slider arm 35, which is mechanically attached to the solenoid armature, is moved in a direction at right angles to the axis of the resistor core 33, as illustrated by the three positions shown in Figure 2. The slider arm 35 may be straight and at an angle to the core or curved so that, as it is moved at right angles to the core, it will wipe the resistance wire in the direction of the winding. This has the effect of causing very little, if any, wear on the resistance wire and also, as far as the wiper is concerned, the wear occurs over its entire length, thus also extending the life of the wiper considerably. Thus, very simply, the curvature of the slider may be altered as desired for the purpose of obtaining any desired linear or nonlinear function. This is a very inexpensive and simple way of achieving a wide variety of different functions. For example, the slider 35 in the illustration is curved to provide a function wherein at one end a larger portion of the resistance is contacted by the slider than at the other end.

Since the control tube in the embodiment of the invention is fed by unrectified alternating current, the solenoid winding 16 is shunted by a capacitor 52. If filters the ripple produced by the tube. To prevent a phase shift in this feedback loop, a resistor 54 is also connected in series with the capacitor. Across this resistor an instantaneous error voltage appears which is communicated to the solenoid winding through the capacitor. This error voltage actuates the solenoid armature without the time lag which would ordinarily be produced by the condenser alone. The resistor also supplies a small ripple component which produces a jitter which reduces mechanical hysteresis.

Referring now to Figure 3, there is shown the embodiment of the invention being employed as either an expander or a compressor. Similar functioning parts are given the same reference numerals as are employed in Figure 1. The source signal is applied from an audio source or amplifier via input terminals 56. These are connected to an input transformer 58 having a primary 60 and a secondary winding 62. The secondary winding is connected in series with a rectifier 64 and a potentiometer 66 in parallel with a condenser 68. The potentiometer slider 70 is connected to the control grid of the tube 22 and supplies a varying positive bias, the magnitude of which is determined by the source signal. The first potentiometer slider 40 is also connected to the end of the transformer secondary winding. Thus, any signals applied to the input terminals 56 cause the tube 22 to draw current, exciting the solenoid coil, causing the armature to move in a direction to move the slider of the first potentiometer in a manner to make the bias more negative and substantially cancel the control voltage being applied to the control grid of the tube 22.

The external circuit is controlled by the second potentiometer 44. Here the terminals 72, 74, 76 may be connected to a speaker (not shown), which is the external system being controlled. Terminal 74 is connected to one side of the primary winding of the transformer 58, and terminal 72 is connected via a rheostat 80 to the slider 46 and to the other side of the primary winding 60. Potentiometer resistor 48 is connected across terminals 72 and 76. Thus, if the loudspeaker is connected between terminals 72 and 74, the speaker output will be compressed. If the loudspeaker is connected across terminals 74, 76, the speaker output is expanded. It is to be understood that the signals being compressed or expanded are the audio signals also being applied as control signals. These are rectified and applied to the control grid of the tube 22. As an illustration and not as a limitation on the invention, in an embodiment which was built, the system shown in Figure 3 has been made to compress variations in the output level of an amplifier over a range of 20 db to a resultant output from the loudspeaker with a range of only one db. As pointed out, the expansion function can also be accomplished by connecting the speaker terminals between terminals 74 and 76.

This invention may also be used as an automatic gain-control device, the second potentiometer being used to control a system in accordance with a desired function from a signal, originating from a sampling microphone, being applied to the control terminals of the invention. Such, for example, can be its employment to control the amplitude of loudspeakers in locations where the ambient noise level varies and it is desired that such monitoring be done automatically with an inexpensive device. In effect, this is a remote volume-control operation.

In an application of the embodiment of the invention to control loudspeaker output, the invention may be placed between the power-amplifier output to the speaker or in an input stage of a power amplifier to control the gain of the power amplifier. Where a plurality of speakers are to be separately controlled they may all be driven from one power amplifier, and this invention may be inserted in the line to each speaker in the manner described to effectuate such individual control from individual control signals. The second potentiometer may be replaced, where required, by a variable T pad or any other variable attenuation device, since manifestly these devices may be controlled by the solenoid armature motion in similar fashion as in the second potentiometer slider to achieve the desired control function. Furthermore, a number of second potentiometers of the type described herein may be interconnected and controlled simultaneously to provide a signal-controlled variable network having desired attenuation and impedance characteristics.

A further use for this invention is in an arrangement wherein a loudspeaker must supply a predetermined acoustical level over a range of frequencies to a microphone whose characteristics are being tested. A standard microphone alongside of the microphone under test supplies signals to this invention which has its second potentiometer calibrated to make any required corrections in the loudspeaker acoustical output level as the different frequencies in the range are being applied thereto.

It is also within the scope of the present invention to control other types of variable reactances which are capable of being altered by mechanical motion. Such, for example, may be a capacitor, wherein the area of the opposed capacitive plates is determined by the motion of the solenoid armature, or the amount of insertion of a core into a coil may be controlled by the solenoid armature motion. The capacitor plates and the shape of the core can be varied to provide further control of the effects of the armature motion on the change in value of the reactance. The latter form of the invention finds utility in a frequency-control arrangement where a frequency is compared with the frequency of a crystal-controlled oscillator and altered to compensate for any difference. Both frequencies, the master and the slave, may be readily converted to a form whereby they may be compared, and any difference is manifested by a control signal. This control signal is applied to an embodiment of the invention which controls either a variable capacitance or variable inductance in the tank circuit of the slave oscillator and makes changes to correct for the difference.

The subject invention may also be employed as an indicating circuit as well as a control circuit wherein a predetermined relationship is to exist between the control signal being applied from a remote point, for example, and either or both the control function and indication function. The coupling of the solenoid armature to control an indicator by its movements are within the skill of one versed in these arts.

There has been described hereinabove a servo-mechanical system which is simple, novel, inexpensive, and useful and which can provide a multiple of different output functions in relation to the input functions by simple changes to the potentiometric device used in the system. While in the embodiment of the invention the opposing bias and control signals are shown being applied between grid and cathode, it is within the scope of this invention to apply them to other control electrodes of an amplifying device in well-known manner with different or the same polarities to achieve the desired oppository effect of these signals.

We claim:

1. A servo-mechanical control system comprising an electron tube having anode, cathode, and control-grid electrodes, a solenoid having a coil connected in series with said tube and an armature movable responsive to excitation of said coil, a source of bias in circuit with said cathode, a potentiometer having its impedance connected in parallel with said bias source, and its slider arm mechanically coupled to said armature and electrically coupled to said grid, a second potentiometer having its slider arm mechanically coupled to said armature, a utilization circuit into which said second potentiometer is coupled, and means to apply control signals to said control grid to determine the excitation of said coil to thereby control the positions of said slider arms of said potentiometers.

2. A servo-mechanical control system as recited in claim 1 wherein each of said potentiometers have their slider arms shaped to provide a desired output function.

3. A servo-mechanical control system comprising an electron-discharge tube having anode, cathode and control grid electrodes, a solenoid having a coil connected in series with said anode and an armature movable responsive to excitation of said coil, a first and a second potentiometer each having a movable slider arm and a resistance, means mechanically coupling both said slider arms to said armature to be movable therewith, a source of bias potential coupled to said cathode, means coupling the resistance of said first potentiometer across said bias potential source, means to apply control voltages between said first potentiometer slider arm and said control grid, a utilization circuit, and means to connect said second potentiometer into said utilization circuit.

4. A servo-mechanical control system as recited in claim 3 wherein, in addition, a resistor and a condenser are connected in series and across said solenoid coil.

5. A servo-mechanical control system as recited in claim 3 wherein the resistances of said first and second potentiometers are wire wound on a core and said slider arms are curved and positioned to successively contact said wire along an edge of said core with a component of motion in the direction of the winding of said wire.

6. A servo-mechanical control system as recited in claim 5 wherein said means to apply a control voltage between said first potentiometer slider arm and said control grid includes an input transformer having a secondary winding, a rectifier connected to one end of said secondary winding, a third potentiometer having a resistor and a slider arm, and a condenser, said resistor and condenser being connected between said rectifier and the other end of said secondary winding, said first potentiometer slider arm being connected to said other end of said secondary winding, and said control grid being connected to the slider arm of said third potentiometer.

7. A servo-mechanical expander-compressor comprising an electron-discharge tube having anode, cathode and control-grid electrodes, a solenoid having a coil connected in series with said anode and an armature movable responsive to excitation of said coil, a resistor, a condenser connected in series therewith, said series-connected resistor and condenser being connected across said coil, a first and a second potentiometer each having a movable slider arm and a resistance, means mechanically coupling both said slider arms to said armature to be movable therewith, a source of bias voltage connected with said cathode, means connecting said first potentiometer resistor across said bias voltage source, an input circuit including an input transformer having a primary and a secondary winding, a rectifier connected in series with one end of said secondary winding, a condenser, a third potentiometer having a resistor and a slider arm said third potentiometer slider arm being connected to said control grid, said third potentiometer resistor and said condenser being connected between said rectifier and said other end of said secondary winding, said first potentiometer slider arm being connected to said other end of said secondary winding; and an output circuit including first, second and third output terminals, means coupling said second potentiometer resistor across said first and third output terminals, means connecting said second potentiometer slider to one end of said primary winding, and means connecting said second output terminal to the other end of said primary winding.

References Cited in the file of this patent

UNITED STATES PATENTS

| | | |
|---|---|---|
| 1,565,091 | Griggs | Dec. 8, 1925 |
| 1,867,139 | Bellescize | July 12, 1932 |
| 2,262,173 | Fisher | Nov. 11, 1941 |
| 2,346,838 | Haight | Apr. 18, 1944 |
| 2,599,862 | Ray | June 10, 1952 |
| 2,602,911 | Wild | July 8, 1952 |